Feb. 28, 1939.  E. E. HEWITT  2,148,750
FLUID PRESSURE BRAKE
Filed Sept. 8, 1934
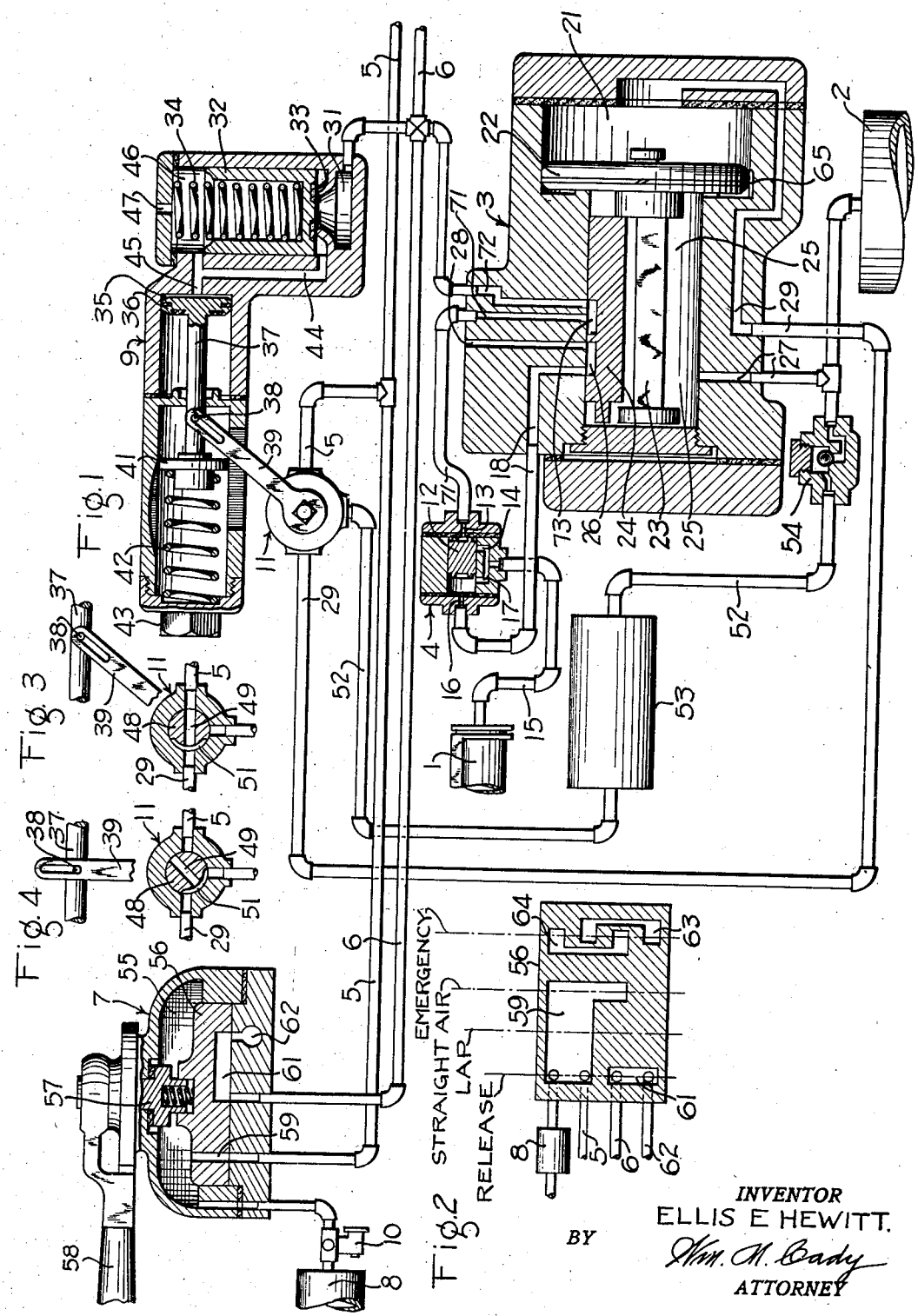
INVENTOR
ELLIS E. HEWITT.
BY
*Wm. M. Cady*
ATTORNEY Patented Feb. 28, 1939

2,148,750

UNITED STATES PATENT OFFICE 2,148,750

FLUID PRESSURE BRAKE

Ellis E. Hewitt, Edgewood, Pa., assignor to The Westinghouse Air Brake Company, Wilmerding, Pa., a corporation of Pennsylvania Application September 8, 1934, Serial No. 743,194

9 Claims. (Cl. 303—25)

This invention relates to a brake equipment for use on multiple unit cars and railway trains, and more particularly to such an equipment adapted for use on high speed trains.

In certain types of high speed train braking equipment, a straight air controlled pipe is provided for effecting service application of the brakes, and an automatic brake is also provided for use in case of failure of the straight air controlled brake, and for effecting an automatic application of the brakes in case of a broken train, and that may also be operated to effect an application of the brakes from any car of the train.

A uniform braking pressure is assured in the case of the straight air controlled brakes since the several brake cylinders are all supplied with fluid under pressure in accordance with the fluid pressure developed in a common straight air pipe. In the case of an automatic brake system, however, where upon a reduction in brake pipe pressure fluid under pressure is supplied to each brake cylinder from the associated auxiliary reservoir there is the possibility that differences in pressure within the several brake cylinders will result, caused by leakage from the brake cylinders, variations in brake cylinder piston travel, and the like, and which will produce different braking forces at different points in the train.

In accordance with my invention I propose to initially apply the brakes automatically by reducing the brake pipe pressure so as to secure a serial application in a minimum time, and then obtain a uniform high development of braking force by transferring the control of the brakes to the straight air pipe system. Such transfer in the control of the brakes in accordance with my invention provides for the quick release of the brakes upon a reduction in straight air pipe pressure before sufficient time has elapsed for the brake pipe pressure to build up sufficiently to operate the triple valve to release position. It also makes possible a desired flexible and uniform control of the braking forces throughout the train when a retardation controller of the type that controls the supply of fluid to the straight air pipe in accordance with the desired rate of retardation of the train is employed, as disclosed, for example, in my copending application, Serial No. 731,855, filed June 22, 1934, for Retardation controlled brakes, and assigned to the same assignee as this invention.

It is an object of my invention to provide a fluid pressure brake equipment that is quick acting both when applying and when releasing the brakes.

It is another object of my invention to provide means for converting an automatic application of the brakes to straight air control of the brakes when the straight air pipe proves to be in good condition.

Another object of my invention is the provision of a fluid pressure brake equipment that is capable of effecting a quick release after automatic application without the necessity of waiting for the brake pipe pressure to build up.

Other objects and advantages of my invention will be apparent from the following description of one embodiment thereof taken in connection with the accompanying drawing in which, Fig. 1 is a diagrammatic view illustrating apparatus comprising one preferred embodiment of my invention, Fig. 2 is a diagrammatic development of the rotary brake valve, Fig. 3 is a sectional view through the transfer valve shown in Fig. 1, and Fig. 4 is a sectional view through the transfer valve in a second operative position.

Referring to the drawing, the brake cylinder 1 represents one unit of a brake equipment that may be supplied with fluid under pressure from an auxiliary reservoir 2 by operation of a triple valve device 3 upon a reduction in pressure in the brake pipe 5 in a well known manner, and which brake cylinder may also be supplied with fluid under pressure in accordance with the fluid pressure developed in the straight air pipe 6. A brake valve device 7 is provided for controlling the flow of fluid under pressure, as supplied by a feed valve 10 from a main reservoir 8, to the brake pipe 5 and to the straight air pipe 6, and for controlling the release of fluid under pressure from the brake pipe and the straight air pipe to the atmosphere, to control the application and release of the brakes. A controlling valve device 9 for controlling the operation of a transfer valve device 11 is provided to effect a transfer in the control of the brakes from brake pipe pressure to straight air pipe pressure when the brakes have been initially applied automatically as a result of a reduction in brake pipe pressure.

While only one braking unit is illustrated it will be appreciated that the train may employ a number of braking units each including a brake cylinder 1, an auxiliary reservoir 2, a triple valve device 3, a controlling valve device 9, and a transfer valve device 11 together with the associated pipe fittings necessary to connect the devices to the brake pipe and to the straight air pipe in the manner illustrated in the drawing.

In accordance with my invention the brake valve device employed is so designed and operated as to effect the supply of fluid under pressure to the straight air pipe up to the maximum pressure supplied by the feed valve 10, and to effect a reduction in brake pipe pressure, when the brake valve device is moved to its emergency application position. The brake valve device is effective to maintain the brake pipe charged when in its straight air or service application position.

A desirable brake valve device to employ in carrying out this invention is the electric self-lapping brake valve device disclosed in my copending application Serial No. 741,064, filed August 23, 1934, relating to Fluid pressure brake equipment and assigned to the same assignee as this application, and in which the supply of fluid under pressure to the straight air pipe and from the straight air pipe to the atmosphere is controlled by magnet valve devices. In order to simplify the illustration and description of the apparatus in this application, I have shown a simple rotary valve for controlling the supply of fluid under pressure to the brake pipe and to the straight air pipe.

The triple valve device 3 comprises a casing having a piston chamber 21 normally connected to the brake pipe 5 by way of pipe 29 when the rotary plug valve 48 of the transfer valve device 11 is in the position illustrated in Fig. 3, and containing a piston 22 and having a valve chamber 25 containing a main slide valve 24 adapted to be operated by the piston 22 through a piston stem 23.

The controlling valve device 9 comprises a casing having a valve chamber containing a spring-weighted valve piston 32 that is urged to its seat 33 by a spring 34. The casing also has a piston chamber 35 containing a piston 36 provided with a stem 37 that carries a pin 38 for operatively engaging a lever or handle 39 of the transfer valve device 11. A head 41 is carried on the end of the stem 37 and engages one end of a spring 42, the other end of which engages a cap nut 43 attached to the end of the casing structure, the spring 42 being effective to urge the head 41 and piston 36 toward the right or to the position illustrated in Figs. 1 and 3 when the spring-weighted valve 32 is in its illustrated position.

Upon an increase in the pressure within the straight air pipe 6 sufficient to raise the valve 32 from its seat against the pressure of the spring 34 communication is established from the straight air pipe 6 to the piston chamber through chamber 31 and passage 44. The upward movement of the valve 32 from its seat causes its upper sleeve portion to lap the port 45 to close communication from the piston chamber 35 to the atmosphere through chamber 46 and exhaust port 47. Upon the supply of fluid under pressure to the piston chamber 35, the piston 36 and the stem 37 are moved toward the left against the bias of the spring 42 to shift the lever 39 from the position illustrated in Figs. 1 and 3 to the position illustrated in Fig. 4.

Referring to Figs. 3 and 4 it will be noted that the lever 39 operates a rotary plug valve 48 that is provided with a port 49 for connecting the brake pipe 5 to the triple valve piston chamber 21 through pipe 29 when the valve is in the position illustrated in Fig. 3, and with a cavity 51 that effects communication between the auxiliary reservoir 2 and the triple valve piston chamber 21 through pipes 52 and 29 when the valve 48 is in the position illustrated in Fig. 4. A volume reservoir 53 is provided in the pipe connection 52 between the auxiliary reservoir 2 and the transfer valve device 11 and a check valve 54 is provided between the auxiliary reservoir 2 and the volume reservoir 53 to prevent the back flow of fluid under pressure from the volume reservoir to the auxiliary reservoir and to the slide valve chamber of the triple valve device.

The brake valve device 7 comprises a casing having a chamber 55 containing a rotary valve 56 that is operatively connected through a stem 57 to a brake valve handle 58. The rotary valve 56 is provided with a port 59 that is adapted to register with a passage leading to the brake pipe 5 when the valve is positioned in its release position so that fluid under pressure is supplied from the main reservoir 8 through the port 25 to the brake pipe 5. The valve 56 is also provided with a cavity 61 that connects the straight air pipe 6 to an exhaust port 62 when the valve is in its release position.

As best shown in Fig. 2 communication is closed between the straight air pipe 6 and the exhaust port 62 when the rotary valve is in other than its release position. The cavity 59 is of such configuration that the brake pipe 5 is maintained connected to the main reservoir 8 when the rotary valve is moved from its release position to its service application, or straight air, position in which position the port 59 also registers with a passage leading to the straight air pipe 6 to supply fluid under pressure from the main reservoir 8, as reduced by the feed valve 10, to the straight air pipe, and from it to the brake cylinder 1 through the double check valve 4'. As will also appear from reference to Fig. 2, when the rotary valve 56 is turned to its emergency position the brake pipe 5 is connected to the exhaust port 62 through a cavity 63, and the straight air pipe 6 is connected to the main reservoir 8 through a cavity 64.

The rotary plug valve 48 of the transfer valve device 11 being in the position shown in Fig. 3, fluid under pressure supplied to the brake pipe 5 flows through port 49 in the transfer valve 48 to the pipe 29 and thence to the triple valve piston chamber 21 of a triple valve device on each car of the train.

Fluid under pressure supplied to the piston chamber 21 flows through the usual feed groove 65 around the piston 22 to the valve chamber 25 and thence through pipe 27 to charge the auxiliary reservoir 2, and past check valve 54 to pipe 52 so as to charge the volume reservoir 53 with fluid under pressure.

When the rotary valve 56 of the brake valve device 7 is in its release position the brake cylinder 1 is in communication with the atmosphere through ports 17 and 16 of the double check valve device 4 and the cavity 26 in the slide valve 24 and exhaust port 28 of the triple valve device 3, if the double check valve 12 is in its illustrated position. If the double check valve 12 is in a position to close communication between the ports 16 and 17 and open communication between the ports 13 and 14, the brake cylinder 1 will be connected to the atmosphere through passages 71 and 72 and cavity 73 in the slide valve 24, through the straight air pipe 6, the groove 61 in the rotary brake valve 56, and the exhaust port 62.

If the operator wishes to make a service application of the brakes, he moves the brake valve handle 58 to its straight air application position in which fluid under pressure is supplied by the feed valve 10 from the main reservoir 8 to the straight air pipe 6.

Fluid under pressure supplied to the straight air pipe flows to the right hand side of the double check valve 12 by way of passage 72, cavity 73 in the slide valve 24, and passage 71. The double check valve 12 is then shifted to its left hand position by straight air pressure in which position communication is established from pipe 71 to brake cylinder pipe 15 so that fluid under pressure from the straight air pipe 6 is supplied to the brake cylinder 1.

When the pressure in the straight air pipe has been increased to the desired degree the rotary valve 56 of the brake valve device 7 is moved to lap position to cut off the further supply of fluid under pressure to the straight air pipe 6 and to the brake cylinder 1, and when it is desired to release the brakes the brake valve device 7 is moved to its release position which permits the release of fluid under pressure from the straight air pipe 6 and consequently from the brake cylinder 1 to the atmosphere by way of exhaust port 62.

If the operator wishes to make an emergency application of the brakes the brake valve handle 58 is moved to its emergency application position in which position the brake pipe 5 is connected through the cavity 63 in the rotary valve 56 with the exhaust port 62, and, in which position, the main reservoir 8 is connected to the straight air pipe 6 through the cavity 64. The reduction in brake pipe pressure effects a reduction in pressure in the triple valve chamber 21 that is in communication with the brake pipe through the passage and pipe 29 when the transfer valve device 11 is in the position illustrated in Figs. 1 and 3. The triple valve piston 22 is then shifted to the right, moving the slide valve 24 to close communication between the passage 18 and the exhaust port 28 through cavity 26 in the slide valve 24 and to uncover passage 18 so that fluid under pressure is supplied from the slide valve chamber 25 and the auxiliary reservoir 2 to passage 18. The double check valve 12 is shifted to the right by the pressure of fluid supplied to pipe 18, so that fluid under pressure is then supplied from the auxiliary reservoir 2 to the brake cylinder.

When the pressure of fluid supplied to the straight air pipe 6 in emergency application position builds up sufficiently to overcome the resistance of the spring 34, the spring-weighted valve 32 will be forced upwardly from its seat closing communication from the piston chamber 35 to the atmosphere through port 45. Fluid under pressure is then supplied from the straight air pipe to the piston chamber 35 to move the piston 36 toward the left against the bias of the spring 42, thus moving the lever 39 and the rotary plug valve 48 from the position shown in Figs. 1 and 3 to the position shown in Fig. 4, to close communication from the brake pipe 5 to the triple valve piston chamber 21 and to open communication from the volume reservoir 53 to the triple valve piston chamber 21. The volume reservoir 53 is used because it provides a reservoir charged with fluid under pressure which does not reduce with the auxiliary reservoir pressure since back flow from the volume reservoir is prevented by the check valve 54, so that the pressure in the volume reservoir can be used to move the triple valve to its release position.

Fluid under pressure will now flow from the volume reservoir 53 through pipes 52 and 29 to piston chamber 21, forcing the piston 22 and the slide valve 24 to their illustrated positions. This connects the chamber to the left of the check valve 12 to the atmosphere through port 16, cavity 26 in the slide valve 24, and exhaust port 28. The supply of fluid under pressure from the straight air pipe 6, through port 13, causes the double check valve 12 to move toward the left closing communication between ports 16 and 17, and opening communication between ports 13 and 14, thus permitting fluid under pressure to flow from the straight air pipe 6 to the brake cylinder 1.

The several brake units of the train are now supplied with fluid under pressure from the straight air pipe 6, thus assuring uniform pressure within the several brake cylinders 1 and a uniform braking on the several train units. When the operator wishes to effect a release of the brakes, the brake valve handle 58 is moved to its release position thus recharging the brake pipe 5, the auxiliary reservoir 2, and the volume reservoir 53 by fluid under pressure supplied by the feed valve 10 from the main reservoir 8 as described above, and effecting the release of fluid under pressure from the straight air pipe 6 and from the brake cylinders 1. Upon a reduction in the pressure within the straight air pipe 6, the spring-weighted valve 32 of the control valve device 9 is forced to its seat, closing communication between the straight air pipe 6 and the piston chamber 35, and opening communication between the piston chamber 35 and the atmosphere through the exhaust port 47, thus releasing fluid under pressure from the piston chamber. This permits the spring 42 to operate the piston 36, together with its stem 37 and the operating lever 39 of the transfer valve device 11, from the position shown in Fig. 4 to the position shown in Figs. 1 and 3, thus again effecting communication from the triple valve piston chamber 21 to the brake pipe 5.

It will be noted that, in accordance with my invention, upon an automatic emergency application of the brakes being effected, the well known rapid application of braking pressures throughout the train is provided as well as the quick build up of pressure in the brake cylinders, while a uniform and maintained brake cylinder pressure throughout the train is assured due to the automatic shifting of the control of the brake cylinder pressure from the auxiliary reservoir to the straight air pipe.

The control of the brakes in accordance with the straight air pipe pressure also permits a quick release of the brakes since upon movement of the brake valve handle to its release position, the release of fluid under pressure from the brake cylinder may be effected immediately, it not being necessary to build up sufficient brake pipe pressure to move the triple valve devices to their release positions before effecting the release of fluid under pressure from the brake cylinders.

It will also be noted that the transfer to straight air pipe control of the brakes is dependent upon straight air pipe pressure, so that, if the straight air pipe should fail, or if, for any reason, pressure within the straight air pipe fails to build up, the transfer from brake pipe control to straight air pipe control of the brakes will not be effected, but the automatic application of the brakes will be maintained.

It will be understood that, if desired, a relay valve device may be employed that is operated in response to variations in pressure in the straight air pipe for controlling the supply of fluid under pressure to the brake cylinder in a well known manner.

While I have illustrated and described one preferred embodiment of my invention it will be apparent to those skilled in the art that many changes in the illustrated apparatus may be made within the spirit of my invention and I do not wish to be limited otherwise than by the scope of the appended claims.

Having now described my invention, what I claim as new and desire to secure by Letters Patent, is:

1. In a fluid pressure brake, in combination, a brake cylinder, a brake pipe, a straight air pipe, a brake controlling valve device operative upon a reduction in brake pipe pressure for supplying fluid under pressure to the brake cylinder, a double check valve device for controlling communication from the straight air pipe and from the brake controlling valve device to the brake cylinder communication through which said brake controlling valve device supplies fluid under pressure to the brake cylinder, said communication being connected to the straight air pipe through said brake controlling valve device in the release position of said brake controlling valve device.

2. In a fluid pressure brake, in combination, a brake cylinder, a brake pipe, a reservoir, a brake controlling valve device operative upon a reduction in brake pipe pressure for effecting the supply of fluid under pressure to the brake cylinder, a straight air pipe, and means operative upon a predetermined increase in pressure in the straight air pipe for interrupting the connection between said brake controlling valve and said brake pipe and for effecting communication between said reservoir and said brake controlling valve device to effect an operation thereof to establish a communication through which the brake cylinder pressure is controlled according to the pressure in the straight air pipe.

3. In a fluid pressure brake, in combination, a brake cylinder, a brake pipe, an auxiliary reservoir and a volume reservoir charged from said brake pipe, a check valve for preventing back flow from said volume reservoir to said auxiliary reservoir, a brake controlling valve device operative upon a reduction in brake pipe pressure for effecting the supply of fluid under pressure from said auxiliary reservoir to the brake cylinder, a straight air pipe, and means operative upon a predetermined increase in pressure in the straight air pipe for effecting the flow of fluid under pressure from said volume reservoir to operate said brake controlling valve device to effect the supply of fluid under pressure to said brake cylinder in accordance with straight air pipe pressure.

4. In a brake equipment for vehicles, in combination, a brake cylinder, means including a brake pipe and an automatic valve for controlling the supply of fluid under pressure to said brake cylinder and having a brake release position, means including a straight air pipe for controlling the supply of fluid under pressure to said brake cylinder, and valve means for effecting operation of said automatic valve to its release position and for effecting a transfer in the control of said brakes from said first named control means to said second named control means after the brakes have been applied.

5. In a brake equipment for vehicles, in combination, a brake cylinder, means including a brake pipe and a triple valve device operative upon a reduction in brake pipe pressure for controlling the supply of fluid under pressure to said brake cylinder, means including a straight air pipe for controlling the supply of fluid under pressure to said brake cylinder, and means responsive to a predetermined pressure in said straight air pipe after a reduction in brake pipe pressure for effecting operation of said triple valve to its release position and for effecting the supply of fluid under pressure to said brake cylinder in accordance with the pressure in said straight air pipe.

6. In a brake equipment for vehicles, in combination, a plurality of braking units each including a brake cylinder, means including a brake pipe, and a triple valve associated with each brake cylinder, for controlling the supply of fluid under pressure to said brake cylinder, means including a straight air pipe for controlling the supply of fluid under pressure to said brake cylinders, manually operable means for controlling brake pipe and straight air pipe pressures, and means responsive to a predetermined pressure in said straight air pipe, after operation of said triple valve to its application position, for effecting operation of said triple valve to its release position and for controlling the supply of fluid under pressure to said brake cylinders.

7. In a brake equipment for vehicles, in combination, a brake cylinder, means including a brake pipe and an automatic valve for controlling the supply of fluid under pressure to said brake cylinder, means including a straight air pipe for controlling the supply of fluid under pressure to said brake cylinder, said brake pipe control means being adapted to effect a quick application of the brakes and said straight air pipe control means being adapted to return said automatic valve to its release position while the brakes are maintained applied by said straight air pipe control means to effect a quick release of the brakes upon a reduction in straight air pipe pressure, and means automatically effective upon the application of the brakes in response to a reduction in brake pipe pressure for transferring the control of the brake cylinder pressure to said straight air pipe control means.

8. In a fluid pressure brake, in combination, a brake cylinder, means including a brake pipe and a triple valve device, responsive to brake pipe pressure, for controlling the supply of fluid under pressure to and the release of fluid under pressure from said brake cylinder, means including a straight air pipe for controlling the supply of fluid under pressure to and the release of fluid under pressure from said brake cylinder, a volume reservoir charged from said brake pipe, and valve means responsive to a predetermined straight air pipe pressure for establishing communication from the volume reservoir to the brake pipe side of said triple valve device to thus effect the movement of the triple valve device to its release position to effect the supply of fluid under pressure to said brake cylinder in accordance with straight air pipe pressure.

9. In a fluid pressure brake, in combination, a plurality of braking units each including a brake cylinder, means including a brake pipe and a triple valve device for controlling the supply of fluid under pressure to each brake cylinder, means including a straight air pipe for controlling the supply of fluid under pressure to each brake cylinder, said brake pipe control means being adapted to effect a quick application of the brakes and said straight air pipe control means being adapted to effect a quick release of the brakes, and means responsive to a predetermined pressure in straight air pipe after operation of said triple valve device to its application position for effecting operation of said triple valve device to its release position to effect the supply of fluid under pressure to said brake cylinder in accordance with straight air pipe pressure.

ELLIS E. HEWITT.